United States Patent
Ding (10) Patent No.: US 8,555,060 B2
(45) Date of Patent: Oct. 8, 2013

(54) MANAGING METHOD, DEVICE AND TERMINAL FOR APPLICATION PROGRAM

(75) Inventor: Ying Ding, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/576,168

(22) PCT Filed: Aug. 13, 2010

(86) PCT No.: PCT/CN2010/076002
§ 371 (c)(1),
(2), (4) Date: Jul. 31, 2012

(87) PCT Pub. No.: WO2011/143852
PCT Pub. Date: Nov. 24, 2011

(65) Prior Publication Data
US 2012/0303954 A1  Nov. 29, 2012

(30) Foreign Application Priority Data
May 21, 2010  (CN) .......................... 2010 1 0187234

(51) Int. Cl.
  *G06F 7/04*  (2006.01)
(52) U.S. Cl.
  USPC ............. 713/165; 713/166; 713/167; 726/31; 726/32; 726/33
(58) Field of Classification Search
  USPC ........................................................ 713/165
  See application file for complete search history.

(56) References Cited

U.S. PATENT DOCUMENTS

| 5,901,282 A | 5/1999 | Tanuma |
| 7,711,680 B2 | 5/2010 | Barnes-Leon |

(Continued)

FOREIGN PATENT DOCUMENTS

| CN | 1787665 A | | 6/2006 |
| CN | 101247589 A | | 8/2008 |
| DE | EP 1-667-021 | * | 6/2006 |
| EP | 1667021 A1 | | 6/2006 |
| WO | 2008109291 A1 | | 9/2008 |

OTHER PUBLICATIONS

International Search Report in international application No. PCT/CN2010/076002, mailed on Mar. 3, 2011.

(Continued)

*Primary Examiner* — Longbit Chai
(74) *Attorney, Agent, or Firm* — Oppedahl Patent Law Firm LLC (57) ABSTRACT

A managing method for an application program is disclosed, which includes that: a first terminal converts a file of a specified application program stored by the first terminal per se into an intermediate file in a predetermined intermediate format, wherein the intermediate format can be identified by other terminals having a running environment of the application program (S101); and the first terminal performs backup management on the specified application program by storing the intermediate file into a specified storage location, so as to enable a second terminal to recover the application program that has been made a backup, wherein both the second terminal and the first terminal have the running environment of the application program (S103). A managing device for an application program and a terminal are further disclosed. By means of the solution of the disclosure, performing universal backup management on an application program is realized, such that terminals that need to recover the application program convert a file in the intermediate format into a format required by each terminal, so as to recover and normally use the application program.

23 Claims, 5 Drawing Sheets

(56) References Cited

U.S. PATENT DOCUMENTS

| | | |
|---|---|---|
| 7,974,949 B2 * | 7/2011 | Niwata et al. ............ 707/640 |
| 2001/0037404 A1 | 11/2001 | Hafsteinsson |
| 2002/0111972 A1 | 8/2002 | Lynch |
| 2004/0172484 A1 | 9/2004 | Hafsteinsson |
| 2004/0249854 A1 | 12/2004 | Barnes-Leon |
| 2006/0026587 A1 | 2/2006 | Lemarroy |
| 2007/0198609 A1 * | 8/2007 | Black et al. ............ 707/204 |
| 2009/0193061 A1 | 7/2009 | Niwata et al. |

OTHER PUBLICATIONS

English Translation of the Written Opinion of the International Search Authority in international application No. PCT/CN2010/076002, mailed on Mar. 3, 2011.

Supplementary European Search Report in European application No. 10851610.5, mailed on Dec. 21, 2012.

* cited by examiner

MANAGING METHOD, DEVICE AND TERMINAL FOR APPLICATION PROGRAM

TECHNICAL FIELD

The disclosure relates to the field of communications, and relates more specifically to a method, a device, and a terminal for managing an application program.

BACKGROUND

At present, a JAVA virtual machine is a necessary configuration for a majority of mobile terminals. A user can install a needed JAVA application program on a terminal by taking the JAVA virtual machine as a platform.

Generally, the mobile terminal is provided with a JAVA application program managing module, which is used for displaying and managing a stored or installed application program, and is further used for providing functions such as starting, installing, updating, cancelling, setting and the like of the application program. However, the current JAVA application program managing module cannot enable the JAVA application program to be backuped and recovered on different terminals.

At present, although a relative standard specification aiming to a JAVA2 Micro Edition (J2ME) is provided, and each JAVA virtual machine manufacturer needs to provide a qualified Application Programming Interface (API) according to the standard, the storage manner of JAVA application program information is not specified in the present standard. Therefore, after the application program is installed on different JAVA virtual machines (i.e., different JAVA platforms), storage structures of various relative information (for example, database information, security setting information and the like) of the application program in a file system are different. The requirement of enabling the application program to be run crossing the platform cannot be met only through utilizing simple backup and recovery.

In addition, all providers hope at present that the copyright of each JAVA application can be protected, and do not allow the JAVA application program to be randomly spread. Therefore, after the user updates the edition of the terminal or changes the terminal, the user cannot continuously use JAVA application on the original terminal due to larger limitation of use of the application program, but needs to renewedly obtain and install an application program matching with the current terminal edition.

Similarly, besides the JAVA, a terminal can further utilize running environment of other application program at present; and the problem that different platforms developed under the same application environment cannot backup and recover the application program further appears.

At present, aiming at the problem in a relative technology that the limitation of use of the application program is large and a user cannot conveniently use the application program because an application program of a terminal cannot be backuped and run crossing platforms, an effective solution is still not provided.

SUMMARY

Aiming at the problem that the limitation of the use of an application program is large and a user cannot conveniently use the application program because the application program cannot backup and run crossing the platform in a relative technology, the disclosure provides a managing method and a managing device for an application program and a terminal, which can backup the application program in a universal manner so as to ensure that the application program can be recovered and normally run on multiple platforms.

The technical solution of the disclosure is realized as follows.

The disclosure provides a managing method for an application program, which is used for ensuring that terminals having a running environment of the application program on various running platforms can recover and run the application program managed.

The managing method for the application program according to the disclosure includes that: a first terminal converts a file of a specified application program stored by the first terminal per se into an intermediate file in a predetermined intermediate format, wherein the intermediate format can be identified by other terminals having the running environment of the application program; and the first terminal performs backup management on the specified application program by storing the intermediate file into a specified storage location, so as to enable a second terminal to recover the application program that has been made a backup, wherein both the second terminal and the first terminal have the running environment of the application program.

Wherein the method may further include that: the second terminal performs recovery management on the specified application program through converting the intermediate file into a file in a specified format required by the second terminal and storing the file in the specified format into the second terminal.

Moreover, the storing the intermediate file into the specified storage location may further include that: the first terminal stores identification information of a predetermined type from the first terminal into the specified storage location, wherein the identification information is used for verifying the second terminal.

Moreover, after the second terminal performs recovery management on the specified application program, the method may further include: obtaining identification information of the predetermined type from the second terminal, and determining whether the identification information obtained from the second terminal is same as the identification information stored in the specified storage location; if the two pieces of identification information are determined to be identical, allowing the second terminal to run the specified application program which has subjected to the recovery management; if the two pieces of identification information are determined to be different, forbidding the second terminal to run the application program which has subjected to the recovery management.

Optionally, the identification information of the predetermined type may include one of following information: identification information of the first terminal, and identification information of a Subscriber Identity Module (SIM) card on the first terminal.

Furthermore, the storing the intermediate file into the specified storage location may further include: encrypting the intermediate file according to a predetermined encryption algorithm, wherein a file subsequently stored into the specified storage location is the file encrypted.

Moreover, before the second terminal converts the intermediate file, the method may further include: decrypting the intermediate file encrypted, wherein a file converted by the second terminal into the specified format during the recovery management is the file obtained by decryption.

The disclosure further provides a managing method for an application program, which is used for ensuring that terminals having a running environment of the application program on various running platforms can recover and run the application program managed.

The managing method for the application program according to the disclosure includes that: a second terminal converts an intermediate file that is stored in a specified storage location and converted into a predetermined intermediate format into a file in a specified format required by the second terminal, wherein the intermediate file is obtained through performing a format conversion on a file of a specified application program by the first terminal, both the second terminal and the first terminal have the running environment of the application program, and the intermediate format can be identified by other terminals having the running environment of the application program; and the second terminal performs recovery management on the specified application program by storing the file which is converted into the specified format.

The disclosure further provides a managing device for an application program, which is configured to ensure that terminals having a running environment of the application program on various running platforms can recover and run the application program managed.

The managing device for the application program according to the disclosure includes: a conversion module, configured to convert a file of a specified application program stored by a first terminal into an intermediate file in a predetermined intermediate format, wherein the intermediate format can be identified by other terminals having the running environment of the application program; and a storage module, configured to perform backup management on the specified application program by storing the intermediate file into a specified storage location, so as to enable a second terminal to recover the application program, wherein both the second terminal and the first terminal have the running environment of the application program.

Wherein the conversion module may be further configured to convert the intermediate file into a file in a specified format required by the second terminal; and the storage module may be further configured to perform recovery management on the specified application program by storing the file which is converted into the specified format into the second terminal.

Moreover, the storage module may be further configured to store identification information of a predetermined type from the first terminal into the specified storage location; wherein the identification information is used for verifying the second terminal.

Moreover, the device may further include: a detection module, configured to obtain identification information of the predetermined type from the second terminal and determine whether the identification information obtained from the second terminal is same as the identification information stored into the specified storage location; if the two pieces of identification information are determined to be identical, allow the second terminal to run the specified application program which has subjected to the recovery management; and if the two pieces of identification information are determined to be different, forbid the second terminal to run the application program which has subjected to the recovery management.

Optionally, the identification information of the predetermined type may include one of following information: identification information of the first terminal, and identification information of an SIM card on the first terminal.

The device may further include: an encryption and decryption module, configured to encrypt the intermediate file according to a predetermined encryption algorithm before the storage module stores the intermediate file into the specified storage location, wherein a file stored by the storage module into the specified storage location is the intermediate file encrypted; and the encryption and decryption module is further configured to decrypt the file encrypted, wherein a file which is converted into the specified format converted by the conversion module during the recovery management is the file obtained by decryption.

The disclosure further provides a managing device for an application program, which is configured to ensure that terminals having a running environment of the application program on various running platforms can recover and run the application program managed.

The managing device for the application program according to the disclosure includes: a conversion module, configured to convert an intermediate file in a predetermined intermediate format into a file in a specified format required by a second terminal, wherein the intermediate file is obtained through performing a format conversion on a file of a specified application program by a first terminal, wherein both the second terminal and the first terminal have the running environment of the application program, and the intermediate format can be identified by other terminals having the running environment of the application program; and a storage module, configured to perform recovery management on the specified application program by storing the file which is converted into the specified format into the second terminal.

The disclosure further provides a terminal, wherein the terminal includes the managing device above for an application program according to the disclosure.

In the disclosure, an application program needing to be backuped is converted into an intermediate form predetermined which can be identified by different terminal platforms, so as to realize to perform universal backup management on an application program, so that terminals needing to recover the application program converts the file in the intermediate format into formats required by the terminals per se respectively, and thus recovers and normally uses the application program.

DETAILED DESCRIPTION

Aiming at the problem in a relative technology that the limitation of use of the application program is large and a user cannot conveniently use the application program because the application program cannot backup and run crossing the platform, the disclosure provides that, an application program needing to be made a backup is converted into an intermediate format predetermined and different terminal platforms can identify the intermediate format and convert a file in the intermediate format into a format required by each terminal platform, such that the application program can be recovered and normally used.

The disclosure will be described in detail with reference to the drawings and embodiments hereinafter.

According to one embodiment of the disclosure, a managing method for an application program is provided, which is used for ensuring that terminals having a running environment of the application program various running platforms can recover and run the application program managed.

Figure 1:
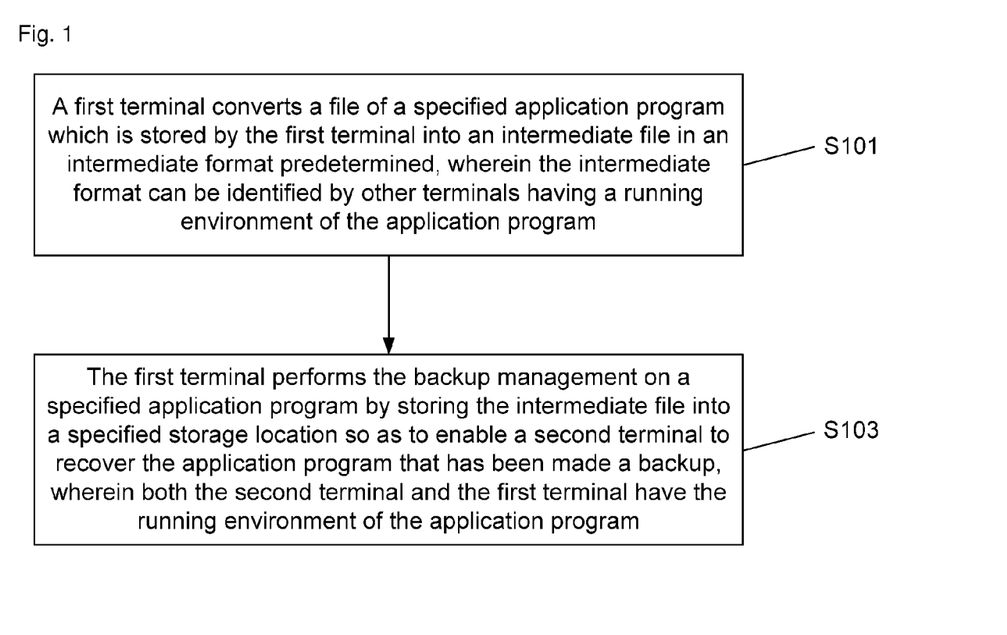
FIG. 1 shows a flowchart of a managing method for an application program according to one embodiment of the disclosure.

As shown in FIG. 1, a flowchart of a managing method for an application program of one embodiment of the disclosure includes that:

Step S101: a first terminal converts a file of a specified application program which is stored by the first terminal into an intermediate file in an intermediate format predetermined, wherein the intermediate format can be identified by other terminals having a running environment of the application program (for example, a universal file format can be selected as the intermediate format).

Step S103: the first terminal performs backup management on a specified application program by storing the intermediate file into a specified storage location (wherein the specified storage location can be a preset memory in the terminal and can be also a memory externally connecting with the terminal, such as a memory card externally connecting with the terminal) so as to enable a second terminal to recover the application program that has been made a backup, wherein both the second terminal and the first terminal have the running environment of the application program (that is, as loon as the first terminal and the second terminal have the running environment of the application program, the second terminal still can identify and recover the application program backuped even though a platform of the second terminal is different from that of the first terminal).

By means of the above processing, the application program needing to be backuped can be converted into the intermediate format predetermined which can be identified by different terminal platforms, so as to realize to perform universal backup management on an application program, so that terminals needing to recover the application program converts the file in the intermediate format into a format required by the terminals per se, even though a running platform of the second terminal is different from that of the first terminal, the second terminal can further recover and normally use an application program backuped by the first terminal.

After the backup of the application program is finished, the recovery management is performed on the specified application program through converting a file (an intermediate file) which is stored into the specified storage location into a file in a specified format required by the second terminal that hopes to recover the specified application program and storing the file in the specified format into the second terminal; hereafter, the second terminal can normally use the recovered application program.

When the processing above is applied to a terminal based on a J2ME environment of a JAVA, running environments of the first terminal and the second terminal are the J2ME environment of the JAVA, and the running environment of the first terminal may be not same as that of the second terminal, that is, a virtual machine of the first terminal is different from that of the second terminal, however, the backup file is the intermediate format capable of being identified by the second terminal, thus the second terminal may convert and recover the backup file so as to perform recovery management for the application program.

When the processing above is applied to a terminal based on the J2ME environment of the JAVA, the performing the backup of the application program specifically includes the following steps that:

(a1) a flow of backuping a JAVA application program is activated and an application program needing to be backuped is determined;

(b1) all information and identification information of the application program (which may be an identity of a terminal or an SIM card and the like, for verifying the terminal recovering the application program) are resolved, and the information are converted into an intermediate format independent of the virtual machine; and (c1) a file obtained from the steps above is stored into an external storage.

Preferably, when the application program needing to be backuped is determined in the Step a1, the application program needing to be backuped is selected by the user through establishing a JAVA application program list interface; and the file is encrypted before the file is stored into the external memory in the Step c1. Besides the user manually selects the application program, the terminal further may designate by default the application program needing to be backuped or recovered.

In the terminal based on the J2ME environment of the JAVA, the performing the recovery of the application program specifically includes the following steps that:

(a2) a flow of recovering the JAVA application program is activated;

(b2) backup data is obtained from an external memory;

(c2) the data format is converted and an intermediate format independent of the virtual machine is converted into a format required by the mobile terminal; and (d2) the application program recovered is added to a mobile terminal, and the identification information of the application program is recorded.

Furthermore, optionally, the storing the intermediate file into the specified storage location further includes that: the identification information of the predetermined type from the first terminal is stored into the specified storage location, wherein the identification information is used for verifying the second terminal. Moreover, the identification information may also be converted into the intermediate format and then is stored into the specified storage location.

After the recovery management is performed on the specified application program, if the second terminal needs to run the application program recovered, the identification information of the specified type may be obtained from the second terminal in advance and it is determined whether the identification information obtained of the second terminal is same as the identification information which is stored into the specified storage location; if yes, the second terminal is allowed to run the specified application program which has subjected to the recovery management; otherwise, the second terminal is forbidden to run the specified application program which has subjected to the recovery management.

Preferably, if both the first terminal and the second terminal are the same terminal (for example, the edition of a software platform of the terminal is updated, since the platform of a new edition and the platform of the old edition have different application program storage manners, the new platform cannot use the application program stored under the old platform); the identification information of the predetermined type may be the identification information of the terminal (for example, the identification information may be International Mobile Subscriber Identity (IMSI), certificate information of the terminal and the like which is the information for uniquely identifying the terminal), and may also be the identification information of an SIM card on the terminal (for example, the telephone number of the terminal or unique identification of the SIM card); if the first terminal and the second terminal are different terminals (for example, the user replaces the originally used first terminal by the second terminal), that is, the user needs to recover the application program on the first terminal to the second terminal, since the identification of the terminal may be changed and the user may not usually change the SIM card, the identification information of the SIM card (for example, the telephone number of the terminal or the unique identifier of the SIM card) can be taken as a reference of verification.

In addition, other information capable of identifying the terminal or the SIM card can be also selected as identification of the reference in the time of the verification, and the disclosure does not list.

Furthermore, it is assumed that three terminals exist, i.e., a terminal A, a terminal B and a terminal C, wherein the terminal A is a terminal which initially installs the application program, next the terminal A performs the backup management for the application program, and the application program is recovered by the terminal B; hereafter, the terminal B performs the backup management for the application program after finishing the recovery of the application program, and the application program backuped by the terminal B is recovered by the terminal C. During the above process, if the telephone number of the SIM card of the terminal A is selected as the identification information of the predetermined type above when the application program is arranged on the terminal A, the telephone number X of the SIM card of the terminal A is stored in the terminal B after the terminal A backups the application program and when the terminal B performs the recovery management; and a verification is performed based on the stored telephone number X of the SIM card and the number of the SIM card carried by the terminal B per se before the terminal B runs the application program, and the terminal B is forbidden to run the application program when the verification is not passed.

In addition, if the file of the application program is backuped and the telephone number X is also stored when the terminal B backups the application program, the telephone number X of the SIM card is stored in the terminal C after the terminal B backups the application program and when the terminal C performs the recovery management; and a verification is performed based on the stored telephone number X of the SIM card and the number of the SIM card carried by the terminal C per se before the terminal C runs the application program, and the terminal C is forbidden to run the application program when the verification is not passed. That is, in the case of multiple backup and recovery, the identification saved when the application program is installed for the first time can be referred when each terminal is verified.

An effective protection can be provided for the copyright of the application program by a process of verification according to the identification information.

In order to ensure the security of the backup file, the file (i.e., the intermediate file) converted into the intermediate format according to the predetermined encryption algorithm can be encrypted, and then the encrypted file is stored into the specified storage location.

Accordingly, before the second terminal converts the intermediate file (i.e., before the file backuped is recovered), the intermediate file encrypted should be decrypted firstly according to an algorithm utilized during the encryption, and then the file obtained by the decryption is converted into a specified format and is stored into the second terminal, so as to finish the recovery of the application program.

Furthermore, when the recovery of the application program is performed, if the application program needing to be recovered exists already on the second terminal, a user can be prompted to perform an operation selection and the corresponding operation is performed according to the user's selection, so as to achieve the purpose of solving conflict; for example, the recovery of the application is stopped if the user selects ignoring an application according to the provided selections; the application currently installed on the second terminal is replaced by the application backuped if the user selects replacing an application; and the application backuped is added to the system of the second terminal if the user selects adding an application.

The processing process of backup and recovery of the application program in the JAVA system will be described in detail hereinafter.

Figure 2:
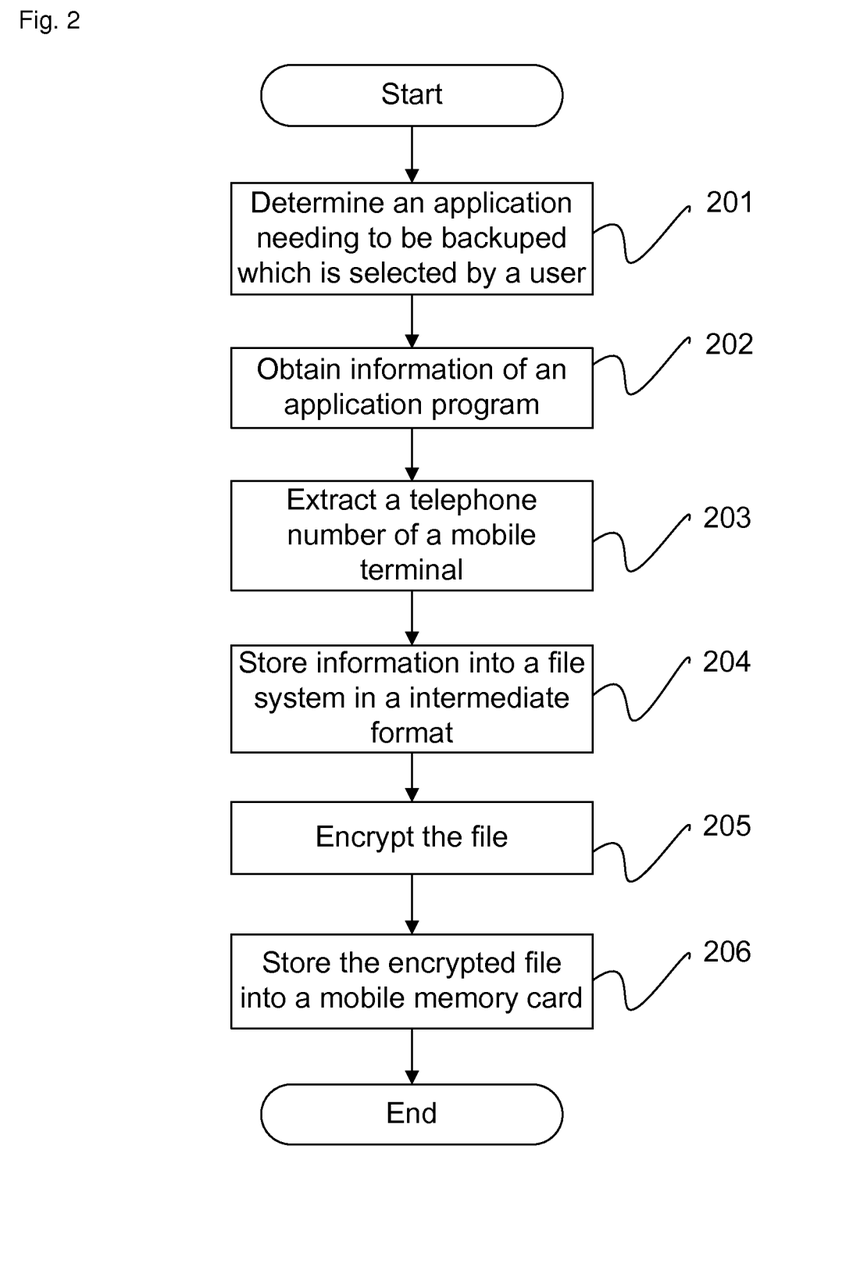
FIG. 2 shows a processing flowchart of performing backup of an application program after the managing method for an application program according to the embodiment of the disclosure is applied to a terminal having a J2ME environment of a JAVA.

FIG. 2 shows a processing flowchart of performing backup of the application program after a managing method for an application program according to the embodiment is applied to a terminal having a J2ME environment of a JAVA.

Figure 7:
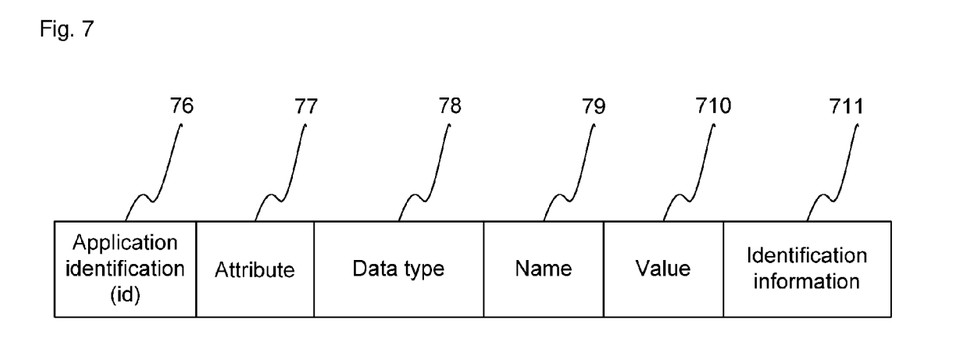
FIG. 7 shows a specific instance of one storage manner of a file which is converted into an intermediate structure.

As shown in FIG. 2, the managing method further includes the following processing steps that:

Step 201: that one or more JAVA application programs needing to be backuped which are selected by a user is determined;

Step 202: information stored into the all JAVA application programs needing to be backuped is obtained;

Step 203: the telephone number (using as referred identification information reference during a verification) of the mobile terminal that is arranged the JAVA application for the first time is extracted;

Step 204: the information obtained from Step 202 and Step 203 are stored according to the intermediate format as shown in the FIG. 7 and are saved into a file system;

Step 205: the file generated by Step 204 is encrypted; and

Step 206: the file encrypted is moved into a mobile memory card.

Figure 3:
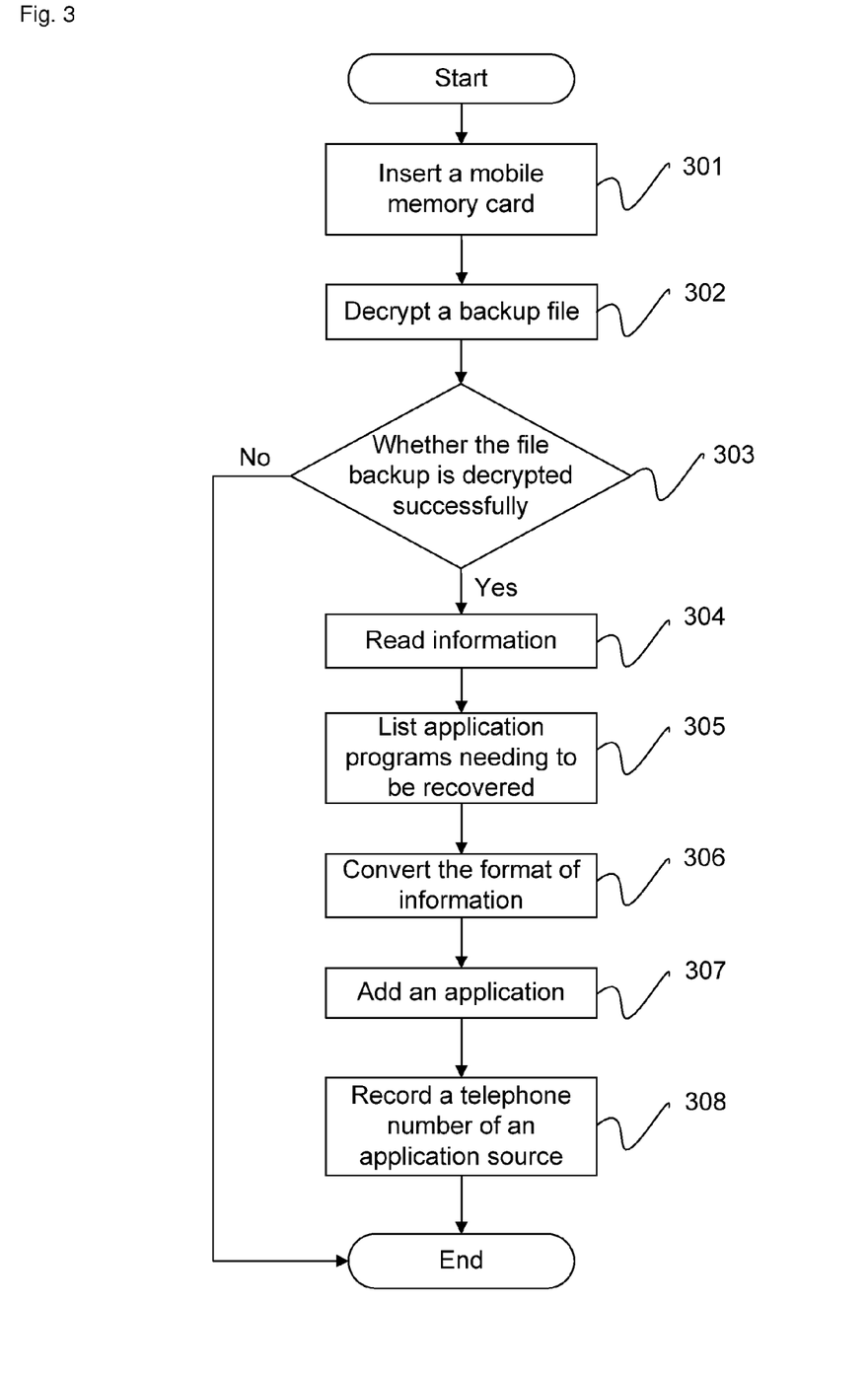
FIG. 3 shows a processing flowchart of performing recovery of the application program after the managing method for an application program according to the embodiment of the disclosure is applied to a terminal having a J2ME environment of a JAVA.

FIG. 3 shows a processing flowchart for performing recovery of the application program after a managing method for an application program according to the embodiment is applied to a terminal having a J2ME environment of a JAVA.

As shown in FIG. 3, the managing method further includes the following processing steps that:

Step 301: a mobile memory card storing a backup file is inserted into a terminal;

Step 302: the backup file is decrypted;

Step 303: it is determined whether the decryption is successful; if yes, the file decrypted is saved into a file system, and Step 304 is executed; otherwise, the processing is ended;

Step 304: information is read from decrypted data according to the format of the FIG. 7;

Step 305: JAVA application programs that have made a backup are listed for a user to select a JAVA application program which needs to be recovered;

Step 306: information of the JAVA application program which needs to be recovered is converted, and is saved as a format needed by a currently used JAVA virtual machine;

Step 307: the JAVA application program is added to the terminal; the user is queried to perform an operation, such as adding an application, ignoring an application, replacing an application or the like, if it is detected that the same application exists in a mobile phone; the application recovered is added to the terminal if the user selects adding the application; the application is not recovered if the user selects ignoring an application; and the application on the current terminal is replaced by the recovered application if the user selects replacing the application; and Step 308: the JAVA application program backuped is associated with the telephone number of the terminal that is installed the application program for the first time, that is, the telephone number of the terminal from that the application program source is derived is recorded.

Figure 4:
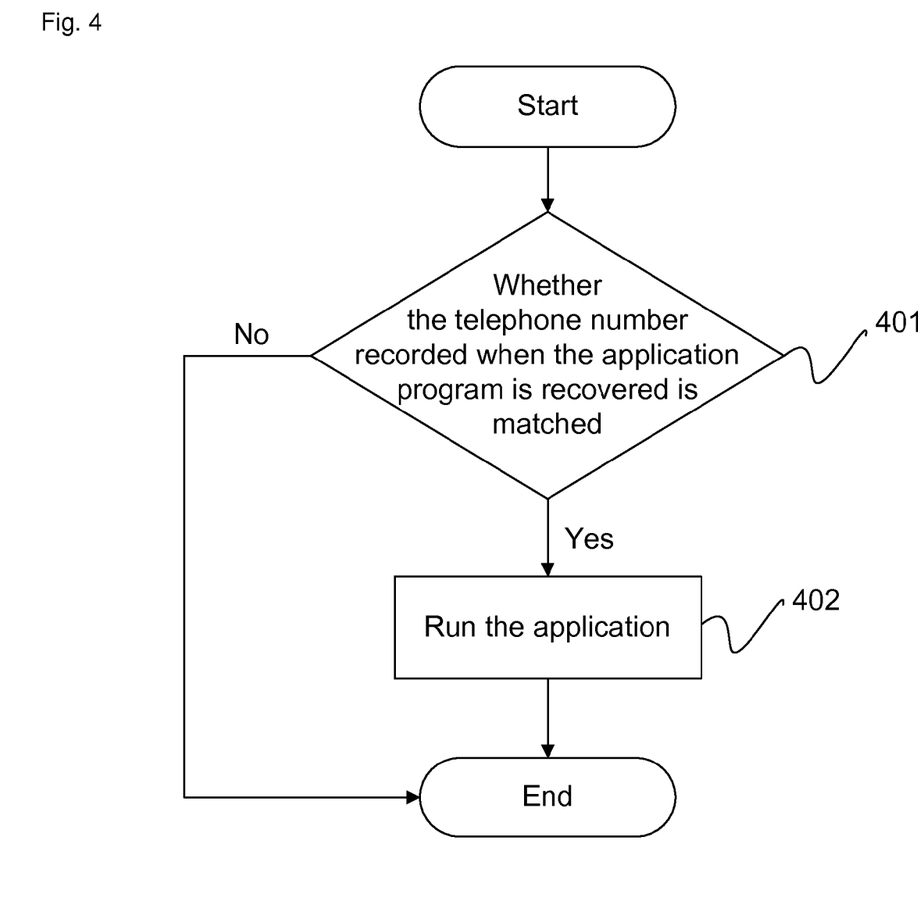
FIG. 4 shows a processing flowchart of running the application program recovered after the managing method for an application program according to the embodiment of the disclosure is applied to a terminal having a J2ME environment of a JAVA.

FIG. 4 shows a processing flowchart of verifying the terminal during running the application program recovered after a managing method for an application program according to the embodiment is applied to a terminal having a J2ME environment of a JAVA. As shown in the FIG. 4, the method specifically includes the following steps that:

Step 401: it is determined whether a telephone number associated with a JAVA application program (i.e., the telephone number recorded when the application is recovered) is matched with a mobile terminal (a telephone number thereof); if yes, Step 402 is executed; otherwise, the processing is ended; and Step 402: the JAVA application program is run.

In this way, although the JAVA virtual machine on the terminal is changed, the application program backuped can also be successfully recovered to various JAVA terminals, so that the recovery and the running of the application program crossing platforms are realized.

By means of the processing above, an application program needing to be backuped can be converted into an intermediate format predetermined capable of being identified by different terminal platforms, so as to realize to perform universal backup management on the application program, so that the terminal needing to recover the application program can convert the file in the intermediate format into a format required by each terminal, so as to recover and normally use the application program; in addition, the security of the backup file can be further improved through encrypting the backup file stored; moreover, the stability and reliability of the recovery of the application program can be ensured through prompting a user to perform a conflict solving manner during the recovery of the application program; furthermore, the processing above either can realize the universal backup and application recovery among different platforms having the J2ME environment of the JAVA, or can be also suitable for various platforms having other environment such as Windows Mobile Pocket or the like, and has wide practicability.

The embodiment according to the disclosure further provides a managing device for an application program.

Figure 5:
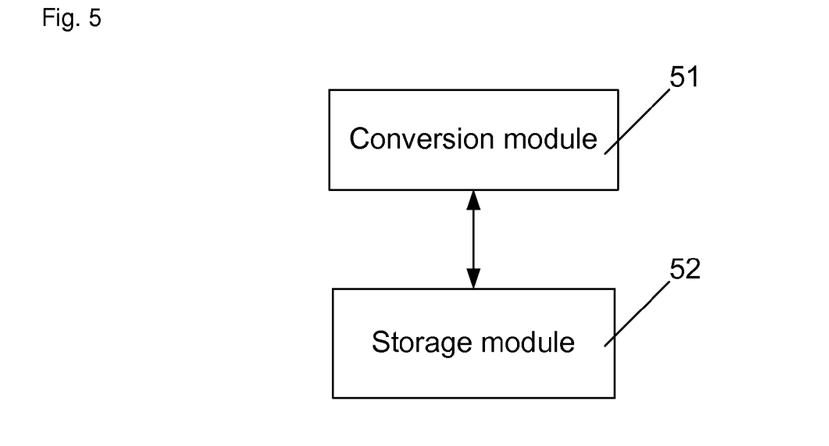
FIG. 5 shows a structural diagram of a managing device for an application program according to one embodiment of the disclosure.

As shown in FIG. 5, a managing device for an application program according to the embodiment according to the disclosure includes:

a conversion module 51, configured to convert a file of a specified application program stored by a first terminal into an intermediate file in a predetermined intermediate format, wherein the intermediate format can be identified by other terminals having the running environment of the application program; and a storage module 52 connected to the conversion module 51, configured to perform backup management on the specified application program by storing the intermediate file into a specified storage location, so as to enable a second terminal to recover the application program, wherein both the second terminal and the first terminal have the running environment of the application program.

By means of the device above, the application program needing to be backuped can be converted into the predetermined intermediate format capable of being identified by the different terminal platforms, so as to realize to perform universal backup management on an application program, so that terminals needing to recover the application program can convert the file in the intermediate format into formats required by the terminals, so as to recover and normally use the application program.

when the file of the application program backuped is recovered, the conversion module 51 is further configured to convert the intermediate file into a file in the specified format required by the second terminal (the second terminal is a terminal expecting to recover the specified application program); and the storage module 52 is further configured to perform recovery management on the specified application program by storing the file which is converted into the specified format into the second terminal.

wherein the storage module 52 is further configured to store identification information of a predetermined type from the first terminal into the specified storage location in order to verify the terminal that runs the application program recovered, wherein the identification information is used for verifying the second terminal.

The device may further include: a detection module (not shown), configured to obtain identification information of the predetermined type from the second terminal and determine whether the identification information obtained from the second terminal is the same as the identification information stored into the specified storage location; if the two pieces of identification information are determined to be identical, allow the second terminal to run the specified application program which has subjected to the recovery management; and if the two pieces of identification information are determined to be different, forbid the second terminal to run the specified application program which has subjected to the recovery management, such that the copyright of the application program can be effectively maintained.

Optionally, the identification information above of the predetermined type may include one of following information: identification information of the first terminal, and identification information of an SIM card on the first terminal. Wherein the identification information of the terminal or the identification information of the SIM card can be taken as the identification referred during the verification when both the second terminal and the first terminal are the same terminal; and the identification information of the terminal or the identification information of the SIM card can be taken as a reference when the second terminal is different from the first terminal.

Preferably, the device above may further include a selection module (not shown), an encryption and decryption module (not shown) and a conflict processing module (not shown); wherein the selection module is configure to display an application program list for backup or recovery such that a user selects an application program that needs to be backuped or recovered, which is helpful to realize backup or recovery of the batch application programs; the confliction processing module is configure to provide a selection of processing solutions for the user during performing recovery when the terminal is provided with the application needing to be recovered, for example, the operation of prompting the user to select ignoring recovery, the operation of replacing the application program file saved by the application program file recovered, and the operation of adding the application program recovered to the terminal system; the encryption and decryption module is configure to encrypt the intermediate file according to a predetermined encryption algorithm before the storage module stores the intermediate file into the specified storage location, in this way, since the file stored by the storage module into the specified storage location is the intermediate file encrypted during performing the backup management, the security of the backup file is ensured and the backup file data is prevented from being stolen by other person; and during the recovery management, the encryption an decryption module is further configured to decrypt the file encrypted, such that the file which is converted into the specified format by the conversion module and which is required by the terminal needing to recover the application program is the file obtained by decryption.

Wherein, the device above may further include a trigger module (not shown), configured to trigger a process of performing backup or recovery on the file of the application program and notify a related processing module after the process is triggered, for example, the trigger module may notify the conversion module to start to perform the format conversion on the file needing to be backuped in the case of triggering the process of backup; and the trigger module may notify the conversion module to start to convert the pre-backup file into a format required by the second terminal when triggering the process of recovery, and if the file backuped is encrypted, the trigger module may firstly notify the encryption and decryption module to decrypt the file backuped, and the specific process is not listed here any more.

Figure 6:
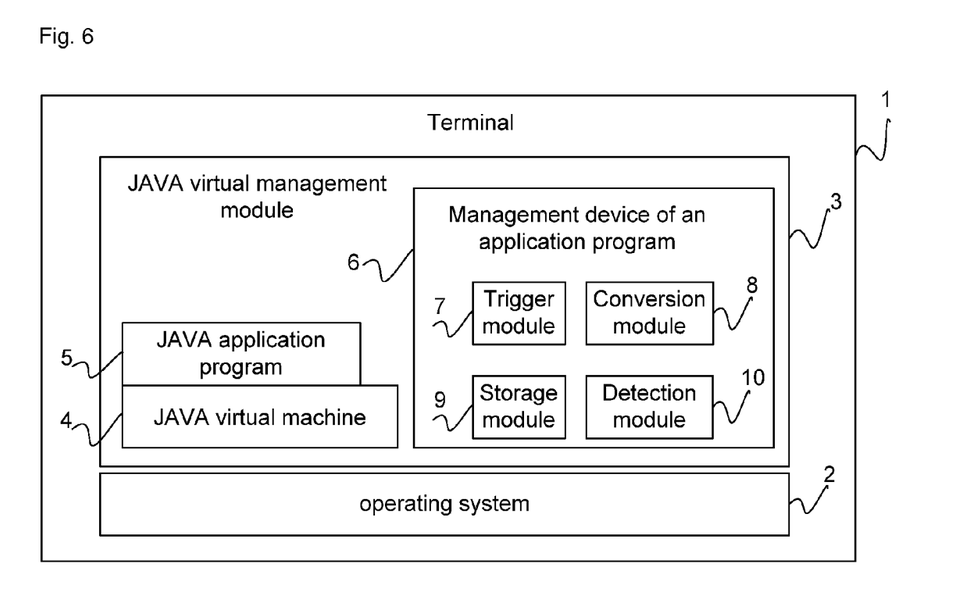
FIG. 6 shows a structural diagram of each functional module on a terminal after the managing device for an application program according to one embodiment of the disclosure is applied to a terminal having a J2ME environment of a JAVA.

FIG. 6 shows a structural diagram of software and each functional module of the device above in the terminal.

As shown in the FIG. 6, after the device above is applied to a terminal having a JAVA application environment, the functional modules in the terminal have the following specific functions that:

an operating system 2 is an operating system of a terminal 1; a JAVA virtual machine management module 3 is an application on an operating system 2 for managing a JAVA virtual machine 4 and a JAVA application program 5; the JAVA virtual machine 4 per se is independent of platform and can provide a running environment of the JAVA application program 5; a managing device 6 for an application program is configured to provide backup, recovery and detection functions for the JAVA application program 5; in the managing device 6 for an application program, the trigger module 7 is responsible for triggering the backup or recover of the application program on the terminal 1 to recover the application program to the terminal 1 from a storage location, such as an external storage, an internal storage or the like; the conversion module 8 takes charge of resolution and conversion of data, which can convert a special data format into an universal format and also can convert the universal data format into a format required by the terminal 1, when the backup is performed, the conversion module 8 can convert the file of the application program on the terminal 1 from the format required by the terminal 1 into a predetermined intermediate format, and when the application saved in the outside or interior memory is recovered, the conversion module 8 can convert the stored file in the intermediate format into the file format required by the terminal 1; the storage module 9 takes charge of storing data in the external memory to realize the backup of the application program on the terminal 1, or copying data in the external memory into the terminal 1 so as to realize the recovery of the application program; and the detection module 10 takes charge of judging whether the recovered application is allowed to run on the terminal 1.

Optionally, the managing device 6 for an application program as shown in the FIG. 6 may be a sub module of the JAVA virtual machine management module 3, or may also be a module in the mobile terminal 1 independent of the JAVA virtual machine managing module 3. Furthermore, the managing device 6 for an application program may further include a selection module, an encryption and decryption module and a conflict processing module.

Since the JAVA application program generates too much additional information after being installed and run, and formats required by the information in different JAVA virtual machines are different, the information in the JAVA application program needs to be resolved and stored in a universal format. FIG. 7 shows one specific embodiment of a storage manner of a file converted into an intermediate structure. Preferably, the file in the intermediate format is different from the format required by the virtual machine, that is, the virtual machine cannot identify the intermediate format. As shown in the FIG. 7, in the storage manner, the identifier identification (id) 76 of the application program is used for identifying the application program which the identification information belongs to; the attribute 77 is used for expressing the classification of information, wherein possible classification includes database, security configuration, application information and the like; the data type 78 is used for expressing a used type when the data is stored, such as integer, character string and the like; the name 79 is used for recording a name of a data item; the value 710 is used for expressing specific data content; and the identification information 711 is used for expressing the identity information (i.e., the identification information of the type predetermined above) of the mobile terminal that is installed the application for the first time.

It should be noted that, the storage manner shown in the FIG. 7 only is a specific embodiment, and in practical application, other related information or ignored part of information can be added according to actual need, which is not illustrated one by one in the disclosure.

Furthermore, the device according to the embodiment can also realize the processing as shown in FIG. 1 to FIG. 4, and the specific processes have been described before and are not repeated again here.

In addition, a terminal with poorer performance may not have the backup function of the application program, but just simply recover the file backuped, and the managing device for an application program can be also arranged in the terminal, and at the moment the device may include:

a conversion module, configured to convert an intermediate file in a predetermined intermediate format into a file in a specified format required by a second terminal, wherein the intermediate file is obtained through performing the format conversion on a file of a specified application program by a first terminal, both the second terminal and the first terminal have the running environment of the application program, and the intermediate format can be identified by other terminals having the running environment of the application program; and a storage module, configured to perform recovery management on the application program by storing the file which is converted into the specified format into the second terminal.

Besides the device according to the embodiment is arranged within a terminal, all functional modules of the device according to the embodiment can be further directly arranged in the terminal, and a part of or all of the functional modules above can be integrated with functional modules of the terminal per se according to actual need; in addition, the functional modules above not only can be realized by a software, but also can be realized by a hardware, such as a Central Processing Unit (CPU), a field programmable gate array and the like.

To sum up, by means of the technical solution above of the disclosure, the application program needing to be backuped is converted into the predetermined intermediate format capable of being identified by different terminal platforms, so as to realize universal backup management on the application program, so that terminals needing to recover the application program can convert the file in the intermediate format into a format required by each terminal, so as to recover and normally use the application program; moreover, the security of the backup file can be further increased through encrypting the backuped file stored; in addition, the stability and reliability of the recovery of the application program recover can be ensured through prompting a user to perform a conflict solving manner during the recovery of the application program; furthermore, the processing above can realize universal backup and application recovery among different platforms having the J2ME environment of the JAVA, can be also suitable for various platforms having other environments, such as Windows Mobile Pocket and the like, and has wide practicability.

The above are only preferred embodiments of the disclosure and are not intended to limit the scope of protection of the disclosure, and any modification, equivalent replacement, improvement and the like made within the spirit and principle of the disclosure shall fall within the scope of protection of the disclosure.

The invention claimed is:

1. A managing method for an application program, which is used for ensuring that, terminals having a running environment of the application program on various running platforms can recover and run the application program managed, the managing method comprising:
    converting, locally by a first terminal, a file of a specified application program stored by the first terminal into an intermediate file in a predetermined intermediate format, the file of the specified application program including additional information of the application program generated after being installed and run on the first terminal, wherein the intermediate format can be identified by other terminals having the running environment of the application program in different virtual machines; and
    performing, by the first terminal, backup management on the specified application program by storing the intermediate file into a specified storage location, so as to enable a second terminal to recover the application program that has been made a backup, wherein both the second terminal and the first terminal have the running environment of the application program.

2. The managing method according to claim 1, further comprising:
    performing, by the second terminal, recovery management on the specified application program through converting the intermediate file into a file in a specified format required by the second terminal and storing the file in the specified format into the second terminal.

3. The managing method according to claim 2, wherein the storing the intermediate file into the specified storage location further comprises:
    storing, by the first terminal, identification information of a predetermined type from the first terminal into the specified storage location, wherein the identification information is used for verifying the second terminal.

4. The managing method according to claim 3, further comprising: after performing recovery management on the specified application program by the second terminal, obtaining identification information of the predetermined type from the second terminal, and determining whether the identification information obtained from the second terminal is same as the identification information stored in the specified storage location;
    if the two pieces of identification information are determined to be identical, allowing the second terminal to run the specified application program which has subjected to the recovery management;
    if the two pieces of identification information are determined to be different, forbidding the second terminal to run the application program which has subjected to the recovery management.

5. The managing method according to claim 4, wherein the identification information of the predetermined type comprises one of following information:
    identification information of the first terminal, and identification information of a Subscriber Identity Module (SIM) card on the first terminal.

6. The managing method according to claim 3, wherein the identification information of the predetermined type comprises one of following information:
    identification information of the first terminal, and identification information of a Subscriber Identity Module (SIM) card on the first terminal.

7. The managing method according to claim 2, wherein the storing the intermediate file into the specified storage location further comprises:
    encrypting the intermediate file according to a predetermined encryption algorithm, wherein a file subsequently stored into the specified storage location is the file encrypted.

8. The managing method according to claim 7, further comprising: before converting the intermediate file by the second terminal, decrypting the intermediate file encrypted, wherein a file converted by the second terminal into the specified format during the recovery management is the file obtained by decryption.

9. The managing method according to claim 1, wherein the storing the intermediate file into the specified storage location further comprises:
    encrypting the intermediate file according to a predetermined encryption algorithm, wherein a file subsequently stored into the specified storage location is the file encrypted.

10. The managing method according to claim 9, further comprising: before converting the intermediate file by the second terminal, decrypting the intermediate file encrypted, wherein a file converted by the second terminal into the specified format during the recovery management is the file obtained by decryption.

11. A managing method for an application program, which is used for ensuring that terminals having a running environment of the application program on various running platforms can recover and run the application program managed, the method comprising:
    converting, locally by a second terminal, an intermediate file that is stored in a specified storage location and converted into a predetermined intermediate format into a file in a specified format required by the second terminal, wherein the intermediate file is obtained through performing a format conversion on a file of a specified application program by a first terminal, the file of the specified application program including additional information of the application program generated after being installed and run on the first terminal, both the second terminal and the first terminal have the running environment of the application program, and the intermediate format can be identified by other terminals having the running environment of the application program in different virtual machines; and performing, by the second terminal, recovery management on the specified application program through storing the file which is converted into the specified format.

12. A managing device for an application program, which is configured to ensure that terminals having a running environment of the application program on various running platforms can recover and run the application program managed, the device comprising:

a conversion module, configured to convert locally at a first terminal a file of a specified application program stored by the first terminal into an intermediate file in a predetermined intermediate format, the file of the specified application program including additional information of the application program generated after being installed and run on the first terminal, wherein the intermediate format can be identified by other terminals having the running environment of the application program in different virtual machines; and a storage module, configured to perform backup management on the specified application program by storing the intermediate file into a specified storage location, so as to enable a second terminal to recover the application program, wherein both the second terminal and the first terminal have the running environment of the application program.

13. The managing device according to claim 12, wherein the conversion module is further configured to convert the intermediate file into a file in a specified format required by the second terminal; and the storage module is further configured to perform recovery management on the specified application program by storing the file which is converted into the specified format into the second terminal.

14. The managing device according to claim 13, wherein the storage module is further configured to store identification information of a predetermined type from the first terminal into the specified storage location; wherein the identification information is used for verifying the second terminal;

and the device further comprising:

a detection module, configured to obtain identification information of the predetermined type from the second terminal and determine whether the identification information obtained from the second terminal is same as the identification information stored into the specified storage location;

if the two pieces of identification information are determined to be identical, allow the second terminal to run the specified application program which has subjected to the recovery management; and if the two pieces of identification information are determined to be different, forbid the second terminal to run the application program which has subjected to the recovery management.

15. The device according to claim 14, wherein the identification information of the predetermined type comprises one of following information:

identification information of the first terminal, and identification information of a Subscriber Identity Module (SIM) card on the first terminal.

16. A terminal, comprising the managing device for an application program according to claim 15.

17. A terminal, comprising the managing device for an application program according to claim 14.

18. The device according to claim 13, further comprising:

an encryption and decryption module, configured to encrypt the intermediate file according to a predetermined encryption algorithm before the storage module stores the intermediate file into the specified storage location, wherein a file stored by the storage module into the specified storage location is the intermediate file encrypted; and the encryption and decryption module further configured to decrypt the file encrypted, wherein a file which is converted into the specified format by the conversion module during the recovery management is the file obtained by decryption.

19. A terminal, comprising the managing device for an application program according to claim 18.

20. A terminal, comprising the managing device for an application program according to claim 12.

21. A terminal, comprising the managing device for an application program according to claim 13.

22. A managing device for an application program, which is configured to ensure that terminals having a running environment of the application program on various running platforms can recover and run the application program managed, the device comprising:

a conversion module, configured to convert locally at a second terminal an intermediate file in a predetermined intermediate format into a file in a specified format required by the second terminal, wherein the intermediate file is obtained through performing a format conversion on a file of a specified application program by a first terminal, the file of the specified application program including additional information of the application program generated after being installed and run on the first terminal, wherein both the second terminal and the first terminal have the running environment of the application program, and the intermediate format can be identified by other terminals having the running environment of the application program in different virtual machines; and a storage module, configured to perform recovery management on the specified application program by storing the file which is converted into the specified format into the second terminal.

23. A terminal, comprising the managing device for an application program according to claim 22.

* * * * *